July 25, 1967 J. J. McCARTHY 3,332,117
RELEASABLE CABLE FASTENER
Filed May 10, 1965 2 Sheets-Sheet 1
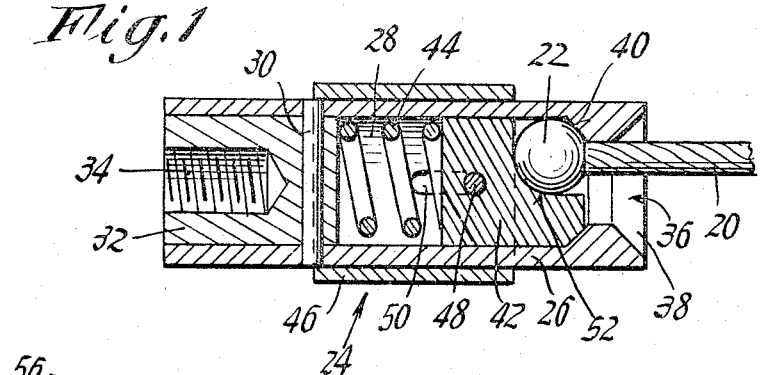
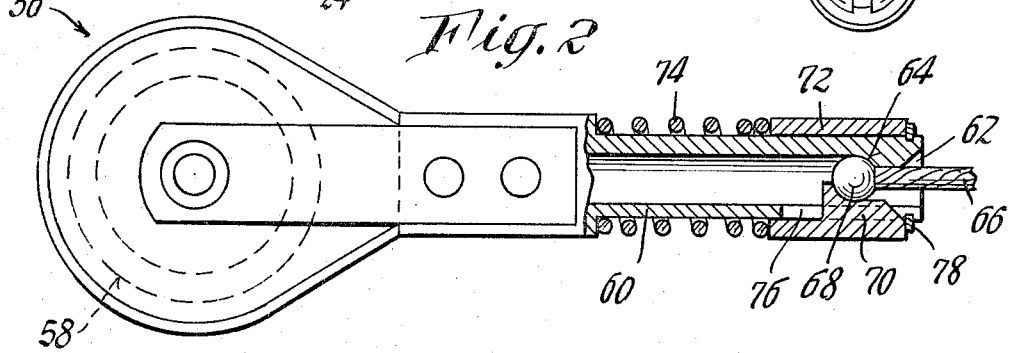
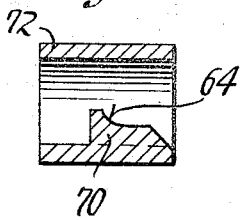
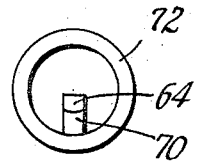
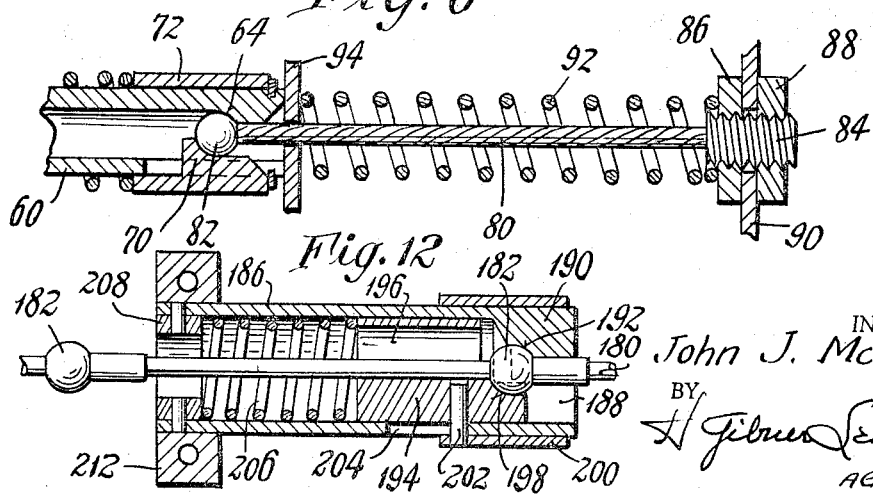
INVENTOR.
John J. McCarthy
BY H. Gilbert Schmann
AGENT July 25, 1967 J. J. McCARTHY 3,332,117
RELEASABLE CABLE FASTENER
Filed May 10, 1965 2 Sheets-Sheet 2
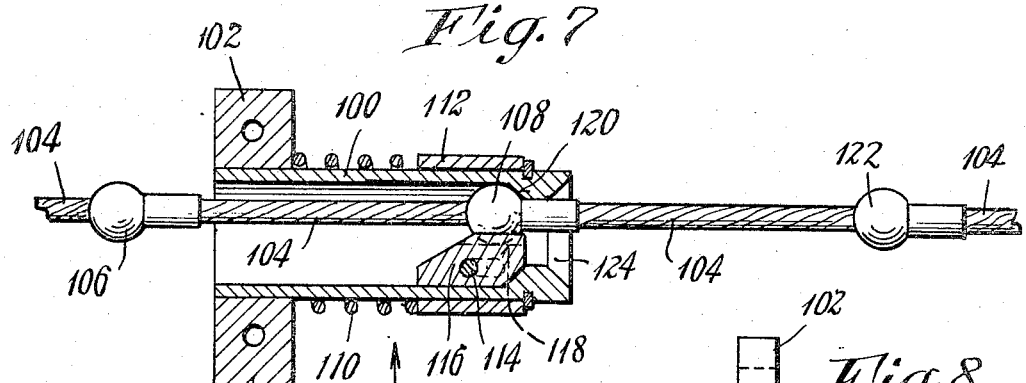
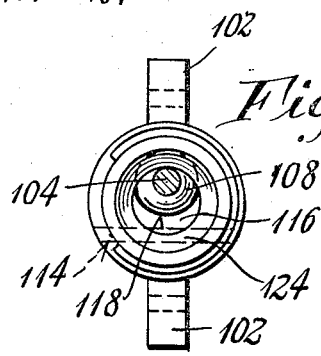
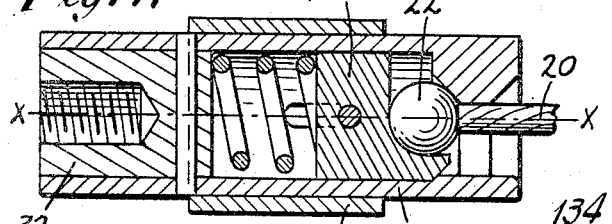
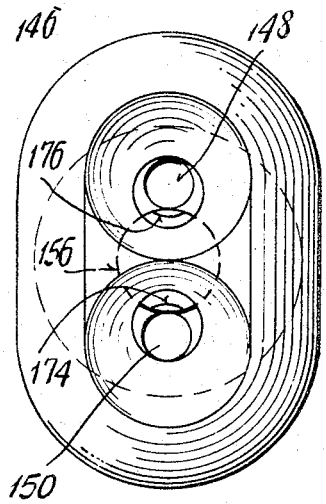
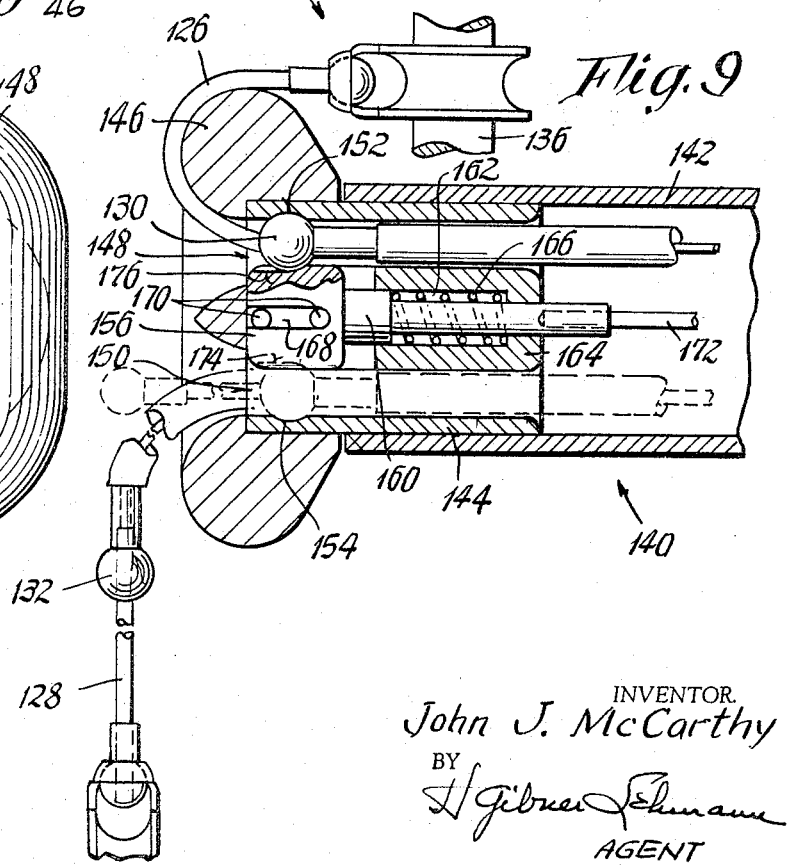
INVENTOR.
John J. McCarthy
AGENT

United States Patent Office 3,332,117
Patented July 25, 1967

3,332,117
RELEASABLE CABLE FASTENER
John J. McCarthy, Weston, Conn., assignor to Norco Incorporated, Ridgefield, Conn., a corporation of Connecticut
Filed May 10, 1965, Ser. No. 454,580
14 Claims. (Cl. 24—123)

This invention relates to releasable fastening devices, and more particularly to devices of the type which are intended to secure cables to cooperable parts.

An object of the invention is to provide a novel and improved cable fastener which is effective and reliable in its operation, yet which involves relatively few parts of simple construction.

Another object of the invention is to provide an improved cable fastener as above, wherein the parts may be readily fabricated by simple standard equipment and may be easily assembled, thereby holding the manufacturing and fabrication cost to a low figure.

A further object of the invention is to provide an improved cable fastener in accordance with the foregoing, which is characterized by a very secure, unfailing grip yet is easily released by moderate forces when such release is required.

Yet another object of the invention is to provide an improved cable fastening device as above outlined, which is not susceptible to accidental or unintentional release in consequence of normal movements and forces which the cooperable parts might experience.

Still another object of the invention is to provide an improved cable fastener or lock as outlined, wherein the cable part may be held in different adjusted positions to take up slack or pay out the cable, as conditions might require.

A feature of the invention resides in the provision of a improved cable fastener or locking device of the kind set forth, which is adaptable to a wide variety of applications utilizing a cable as one of two separable or relatively movable parts.

A still further object of the invention is to provide a novel and improved cable fastener as characterized, wherein a multiplicity of cables may be simultaneously secured and released, said fastener involving relatively few parts and providing for simple and easy release or unlocking of the cables.

Other features and advantages will hereinafter appear.

In the drawings accompanying this specification, similar characters of reference are used to designate like components throughout the several views, in which:

FIG. 1 is an axial sectional view of a cable fastener device as provided by the invention.

FIG. 2 is a view partly in axial section and partly in side elevation of a cable fastener, illustrating another embodiment of the invention.

FIG. 3 is a right-end elevational view of the cable fastener of FIG. 2.

FIG. 4 is an axial sectional view of the locking slide member of the fastener device of FIGS. 2 and 3.

FIG. 5 is an end elevational view of the locking slide member shown in FIG. 4.

FIG. 6 is an axial sectional view of a cable fastener illustrating yet another embodiment of the invention.

FIG. 7 is an axial sectional view of a cable fastener which provides for adjustable positioning of the cable, constituting still another embodiment of the invention.

FIG. 8 is a right end elevational view of the cable fastener of FIG. 7.

FIG. 9 is an axial sectional view of a cable fastener employing a multiplicity of cables, constituting still another embodiment of the invention.

FIG. 10 is a left end elevational view of the receiver part of the cable fastener of FIG. 9.

FIG. 11 is an axial sectional view similar to that of FIG. 1 but showing a modified form of the invention.

FIG. 12 is an axial sectional view generally similar to that of FIG. 7, but showing another modified form of the invention.

Referring first to FIG. 1, the cable fastener device illustrated therein comprises a cable part 20 having an enlargement 22 provided on its extremity. The cable 20 may be of twisted or stranded metal wire construction, and the enlargement 22 may be in the form of a metal ball which is securely swaged or otherwise attached to the cable.

The receiver part of the fastener is indicated generally by the numeral 24, and comprises a tubular body 26 having a bore 28 in which there is secured, as by means of a transverse pin 30, and end plug 32 having a threaded central bore 34 by which the receiver part may be conveniently attached to a supporting or other surface.

The tubular body 26 has a front opening 36 with a flared mouth 38, such opening being aligned with the bore 28 and constituting a part of the same, as will be understood. The opening 36 is adapted to receive the cable 20 and enlargement 22 thereof when the fastener is to be assembled. The body 26 has an internal shoulder 40 which in FIG. 1 is shown as of annular configuration, such shoulder being adapted for engagement by the enlargement 22 as clearly seen in this figure. Such engagement serves to retain the enlargement 22 in the receiver part in a manner that will now be brought out.

Movable within the body 26 is a clamping slide member 42 which is shiftable between an advanced position as seen in FIG. 1 wherein it clamps the cable enlargement 22 against the internal shoulder 40 to prevent withdrawal of the enlargement and cable, and a retracted position shifted to the left from that shown in FIG. 1, wherein it releases the enlargement to free the same and the cable. A helical compression spring 44 is provided in the body 26 for engagement with the slide member 42 and the inner end of the plug 32, such spring normally holding the slide member in the advanced locking position of FIG. 1. Also, manually operable means comprising a sleeve 46 is provided, for shifting the slide member 42 from a point or location which is exterior to the body 26. The sleeve 46 is freely slidable on the body 26, and is connected to the slide member 42 by a pin 48 passing through said parts and also passing through longitudinally extending slots 50 in the opposite walls of the body 26. The slide member 42 has a socket or depression 52 in its forward or right-most end, to nest the enlargement 22 of the cable 20, as may be readily understood.

Operation of the cable fastener is quite simple, being explained as follows: Assemblage of the fastener may be effected by either first retracting or shifting to the left the release sleeve 46, which moves the slide member 42 to the left, or else by forcibly inserting the cable enlargement 22 in the opening 36 of the receiver. Such forcible insertion will shift the slide member 42 and the release sleeve 46 to the left against the action of the return spring 44. Upon the enlargement 22 reaching the shoulder 40 the tendency of the spring 44 will be to shift the enlargement to the locked position as shown in FIG. 1, wherein the slide member 42 retains the enlargement and prevents withdrawal of the same. Any pulls on the cable 20 will not free the enlargement 22 for the reason that the locking surface of the socket 52, being substantially parallel to the axis or direction of movement of the slide member 42, will have no camming effect. The camming effect of the sloping internal shoulder 40 will tend to shift the enlargement 22 downward as viewed in FIG.

1, but such movement will be blocked by the non-sloping portion of the socket 52, with the result that the cable and enlargement will be locked in the receiver against withdrawal.

When it is desired to release the cable 20 and enlargement 22 the operator merely shifts the sleeve 46 to the left from the position shown in FIG. 1, this in turn shifting the slide member 42 to the left whereupon the enlargement 22 will be released and may be withdrawn from the receiver.

Another embodiment of the invention is illustrated in FIGS. 2–5. Here a conventional swivel block 56 having a pulley 58 is secured to a tubular receiver body 60 provided with a front opening 62 and an internal shoulder 64. The cable 66 and enlargement 68 thereof are received through the front opening 62, with the enlargement engageable with the shoulder 64 as seen in FIG. 2. A slide member 70 in the body opening 62 is engageable with the enlargement 68 to clamp the latter against the internal shoulder 64. The slide member 70 comprises a flat piece of uniform thickness, and such piece may be integral with the release sleeve 72 surrounding the receiver body 60. A helical coil spring 74 around the body 60 engages the sleeve 72 to normally hold the same in the advanced or rightmost locking position shown.

The tubular body 60 has a longitudinal slot 76 through which the slide member 70 extends, and a retaining ring 78 at the front end of the body 60 constitutes a stop for the release sleeve 72 and slide member 70 thereof. Operation of the embodiment of FIGS. 2–5 is generally similar to that already described above in connection with the embodiment of FIG. 1.

Another embodiment of the invention is illustrated in FIG. 6. Here, a receiver 56, 60 similar to that shown in FIGS. 2–5, is cooperable with a cable 80 having an enlargement 82. The cable 80 is secured to a screw 84 held by nuts 86, 88 to an anchorage or support member 90 which may be part of a housing or other structure. Surrounding the cable 80 is a helical compression spring 92 which engages the uppermost nut 86 and also a washer 94 around the cable 80. Normally, when the fastener is disconnected or unassembled, the washer 94 is in engagement with the enlargement or ball 82. The assemblage of the fastener is effected by withdrawing or shifting upward the release sleeve 72 and applying the receiver body 60 against the washer 94, depressing the latter and compressing the sleeve 92. The ball 82 will enter the bore of the body 60, and upon release of the sleeve 72 the locking member 70 will clamp the ball securely against the internal shoulder 64 of the body 60. The cable 80 and the spring 92 are readily yieldable whereby considerable freedom of movement is had of the fastener. When it is desired to release the same, the operator merely shifts or pulls upward the release sleeve 72, and the force of such movement will also result in the entire receiver 56, 60 being pulled upward away from the cable and ball assemblage.

Another embodiment of the invention is illustrated in FIGS. 7 and 8, wherein an adjustable positioning of the cable part is possible. In these figures, the receiver part 98 comprises a tubular body 100 having mounting lugs 102 at opposite sides of its back end. Such back end of the body 100 is not closed, but instead is open to provide a passage for the cable part 104. The cable 104 has a multiplicity of balls or enlargements 106, 108, etc. Slidable on the tubular body part 98 against the action of a return spring 110 is the release sleeve 112. This sleeve is connected by a pin 114 passing through slots (not shown) in the body 100 and through a slide member 116. The slide member 116 has a nesting portion or depression 118 which is engageable with the balls 106, 108 and is arranged to clamp the said balls against an internal shoulder 120 provided on the body 100.

With the construction shown, any pulls on the cable 104 from left to right will not release the cable but instead the latter will be securely held in the receiver part 98. On the other hand, if a pull from right to left is applied to the cable 104, it will enable the latter to be shifted whereby the ball 108 leaves the locking parts and a subsequent ball 122 enters the opening 124 of the receiver for engagement with the shoulder 120 and slide member 116. Thus, an adjustable positioning of the cable 104 is possible by merely pulling on the same from right to left. When it is desired to release the cable, the operator must shift the release sleeve 112 from right to left against the action of the spring 100, as with the other forms of the invention.

Yet another embodiment of the invention is illustrated in FIGS. 9 and 10. In this embodiment one receiver part is so arranged that it releasably secures a multiplicity of cables, the arrangement shown involving two cables 126, 128 respectively having enlargements 130, 132. The cables 126, 128 may be secured to various fittings or parts, as for example two eyelet assemblies such as the assembly 134 used on sail boats in connection with sail or sheet lines 136 of a spinnaker. On those occasions when it is desired to release the spinnaker line this may be effected most advantageously and conveniently by use of the improved cable fastener of the invention involving the cables 126, 128.

The receiver 140 comprises a tubular body assemblage 142, 144 and mouth part 146, the body assemblage having openings 148, 150 for receiving respectively the cables 126, 128. In the openings 148, 150 internal shoulders 152, 154 are provided, for engagement with the balls 130, 132 of the cables. A locking slide member 156 has a shank 160 which is slidable in the bore 162 of a tubular guide portion 164 of the receiver body. A helical coil spring 166 in the guide 164 normally urges the locking slide member 156 to the left as viewed in FIG. 9. The slide member 156 has a slot 168 to accommodate transverse pins 170 of the receiver body 144, such pins constituting additional guide means. A release cable 172 connected with the shank 160 of the slide member serves to shift the latter from left to right, to the retracted position. The locking position of the slide member is shown in FIG. 9, such member having notches or grooves 174, 176 for engagement with the balls 130, 132 to effect the clamping of the latter against the shoulders 152, 154.

Operation of the cable fastener is in general similar to that already described above. With the parts in the position shown in FIG. 9, the cables 126, 128 are located and prevented from being withdrawn (from right to left). When the release cable 172 is pulled from left to right, it will shift the slide member 156 in the same direction, enabling such member to disengage the locked balls 130, 132 whereupon the balls and the cables may be withdrawn freely.

Another embodiment of the invention is illustrated in FIG. 11. Parts shown herein are generally similar to those of FIG. 1, with the exception of the slide member which locks the ball, and the tubular body in which the ball is received. In FIG. 11, the tubular body 26a has an opening for the ball 22, which is off-set with respect to the axis x—x of the body. That is, the opening for the ball is eccentric with respect to the axis x—x of the entire device. Also, the slide member 42a has an offset nest or clamping portion, in keeping with the eccentric disposition of the opening of the body 26a. By such organization, the cable 20 and ball 22 will be perfectly in alignment with the end plug 32 and the threaded central bore thereof. Thus, the tensile forces of the cable 20 will be centralized and aligned with the mounting or counter-forces experienced by the plug 32. Otherwise, the operation of the fastener is the same as already described in connection with FIG. 1.

The embodiment of FIG. 12 involves a feed-through type fastener, just as with the embodiment of FIG. 7. However, the FIG. 12 construction effects a centralization of the cable part in the receiver part, as distinguished from an eccentric disposition of the cable part in FIG. 7.

In FIG. 12 the cable part 180 has enlargements or balls 182 at spaced intervals, said cable part passing through the receiver part 184 comprising the tubular body 186. At its front end, the body 186 has an opening 188, and the body has a bore through which the cable part 180 passes. Adjoining the opening 188 there is an internal shoulder 190 with a concavity 192 arranged for engagement by one or the other of the balls 182. A clamping slide member 194 is provided for sliding movement in the body 186, such member having an opening or bore 196 through which the cable 180, 182 passes. The slide member 194 has a concave or hollow configuration 198 for locking engagement with the balls 182, and the member is actuated by a manually operable sleeve 200 connected to it by a pin 202 passing through a slot 204 in the tubular body part 186. A helical compression spring 206 normally holds the slide member 194 and the sleeve 200 in the advanced, locking position shown in FIG. 12, one end of the sleeve engaging an annular end plug 208 secured to the body 186 by pins 210. The body 186 has mounting lugs 212 at its back end, adjacent the annular plug 208.

The arrangement of the passages 188, 196 respectively in the body 186 and the slide member 194 is such that the cable part 190 is centralized or aligned with the axis of the body 186 and receiver part 184, as shown. Such alignment is obtained in a manner similar to that illustrated in FIG. 11. Release of the cable part is effected by shifting the sleeve 200 from the right to the left, against the action of the return spring 206, operation of the fastener being generally similar to that already described in connection with the preceding embodiments.

It will now be understood from the foregoing that I have provided a novel and improved cable fastener and locking device which securely locks a cable to a cooperable part, such device involving relatively few parts of simple construction, being sturdy and resistant to failure, and effecting a positive securement of the cable while at the same time enabling release of the cable to be had easily and conveniently, and with relatively moderate pressures. The fastener is easy to use, and the release of the cables may be effected by the same movement which shifts the release sleeve from its locking position.

Variations and modifications may be made within the scope of the claims, and portions of the improvement may be used without others.

I claim:
1. A releasable fastener comprising, in combination:
   (a) a flexible cable,
   (b) an enlargement on said cable,
   (c) a receiver part for said cable and enlargement, said receiver part comprising:
      (1) a tubular body having an annular end with an opening into and through which end and opening the cable and enlargement are passed to assemble the fastener,
      (2) an internal shoulder projecting radially into the body opening,
      (3) a clamping slide member movable forward and backward in the body opening respectively between an advanced, forward position wherein it clamps the cable enlargement against the internal shoulder to prevent withdrawal of the enlargement and cable, and a retracted, backward position wherein it releases the enlargement to free the same and the cable, said member having a forwardly facing and directed surface engageable with a rearwardly facing and directed surface of the said enlargement to effect said clamping,
      (4) spring means normally holding the slide member in advanced position and yieldably maintaining the forwardly facing surface thereof in said engagement with the rearwardly facing surface of the enlargement, and
      (5) operable means for shifting the slide member rearward against the action of said spring means so as to release the enlargement, said operable means being accessible from a point exterior to the body.
2. A releasable fastener as in claim 1, wherein:
   (a) the body is elongate and has a side slit adjacent said annular end and the bore of the end comprises said opening, said enlargement of the cable being larger than the greatest width of said slit whereby it is retained in the body against removal laterally of the body,
   (b) said slide member being disposed in and moving along the bore of the body,
   (c) said operable means comprising a sleeve surrounding the body and movable along the same, and having a connection with the slide member.
3. A releasable fastener as in claim 2, wherein:
   (a) the spring means comprises a coil disposed in the bore of the tubular body and engaging the slide member.
4. A releasable fastener as in claim 2, wherein:
   (a) said slide member comprises an inward projection on the sleeve, extending through the slot of the body side wall and abutting and extending inward past the side edge surfaces of the slot.
5. A releasable fastener as in claim 4, wherein:
   (a) said inward projection comprising a lug of uniform thickness commensurate with the width of the said slot.
6. A releasable fastener as in claim 5, wherein:
   (a) said lug having an edge which slopes with respect to the body axis and which has a depression for engagement with the cable enlargement.
7. A releasable fastener as in claim 1, wherein:
   (a) the cable passes entirely through the body bore and has at least one additional enlargement, said enlargements on the cable being spaced apart and each constituting a separate stop engagable with said shoulder and slide member independently of the other enlargement whereby different portions of the cable can be secured in the receiver.
8. A releasable fastener as in claim 7, wherein:
   (a) the cable is in alignment with the axis of the receiver part,
   (b) said slide member having a through opening, through which the cable passes.
9. A releasable fastener as in claim 1, wherein:
   (a) an anchorage is provided, to which the cable is secured,
   (b) a coil spring surrounding the cable, at one end engaging the anchorage,
   (c) a washer on the cable, engaged with the other end of the coil spring and engageable with the enlargement of the cable.
10. A releasable fastener as in claim 1, wherein:
    (a) the slide member has a frontal abutment surface engageable by the cable enlargement to effect retraction of the member in response to insertion of the enlargement in the opening of the receiver body.
11. A releasable fastener as in claim 1, wherein:
    (a) the operable means comprises a cable connected to the slide member and passing out of the said body.
12. A releasable fastener as in claim 1, wherein:
    (a) the body has an additional opening,
    (b) a portion of said slide member being disposed in the additional opening,
    (c) a second flexible cable and enlargement thereon, disposed in said additional opening,
    (d) said body having an internal shoulder in the additional opening, engageable with the second cable enlargement,

(e) said portion of the slide member being engageable with the second cable enlargement to lock the same and the second cable in the said additional opening.

13. A releasable fastener as in claim 12, wherein:
   (a) the slide member is disposed between the openings of the body,
   (b) said slide member having a longitudinal slot,
   (c) said body having a transverse pin extending through the slot of the slide member and constituting a guide therefor.

14. A releasable fastener as in claim 12, wherein:
   (a) the body has a tubular guide between the openings thereof,
   (b) said slide member having a shank disposed and movable in said tubular guide, by which the member is mounted for movement in the body.

References Cited
UNITED STATES PATENTS

| | | |
|---|---|---|
| 1,760,786 | 5/1930 | Sleeman. |
| 2,305,234 | 12/1942 | Bratz _____ 287—80 |
| 2,440,012 | 4/1948 | Haver. |
| 2,556,117 | 6/1951 | Smith. |

BERNARD A. GELAK, *Primary Examiner.*